United States Patent
Quatrini

(10) Patent No.: US 9,736,635 B2
(45) Date of Patent: Aug. 15, 2017

(54) METHOD FOR CONTROLLING A NETWORK OF DYNAMIC SIGNAGE DEVICES AND GUIDANCE SYSTEM CONFIGURED TO IMPLEMENT SUCH A CONTROL METHOD

(71) Applicant: CHARVET INDUSTRIES, Miribel (FR)

(72) Inventor: Christophe Quatrini, Fontaines Saint Martin (FR)

(73) Assignee: CHAVRET INDUSTRIES, Miribel (FR)

( * ) Notice: Subject to any disclaimer, the term of this patent is extended or adjusted under 35 U.S.C. 154(b) by 0 days.

(21) Appl. No.: 15/065,751

(22) Filed: Mar. 9, 2016

(65) Prior Publication Data

US 2016/0277886 A1    Sep. 22, 2016

(30) Foreign Application Priority Data

Mar. 11, 2015    (FR) ..................................... 15/52011

(51) Int. Cl.
*H04W 24/00* (2009.01)
*H04W 4/02* (2009.01)
*G01C 21/20* (2006.01)
*H04W 8/24* (2009.01)

(52) U.S. Cl.
CPC ............ *H04W 4/021* (2013.01); *G01C 21/20* (2013.01); *H04W 4/025* (2013.01); *H04W 8/24* (2013.01)

(58) Field of Classification Search
CPC ....... H04W 4/021; H04W 8/24; H04W 4/025; G06Q 90/20; G08G 1/005; G09F 9/00; G01C 21/20
See application file for complete search history.

(56) References Cited

U.S. PATENT DOCUMENTS

| 5,920,634 | A  | * | 7/1999 | Chiquette | G09F 7/22 |
| | | | | | 381/124 |
| 6,624,742 | B1 | * | 9/2003 | Romano | G09F 9/00 |
| | | | | | 340/12.5 |
| 2012/0221385 | A1 | * | 8/2012 | Fine | G06Q 30/02 |
| | | | | | 705/14.4 |
| 2014/0085109 | A1 | * | 3/2014 | Stefik | G06Q 10/02 |
| | | | | | 340/932.2 |

(Continued)

*Primary Examiner* — Ajit Patel
(74) *Attorney, Agent, or Firm* — Cantor Colburn LLP

(57) ABSTRACT

A method for controlling a network of dynamic signage devices, comprising the following steps such as: collecting the destination of a user; detecting the user within a detection perimeter of a determined dynamic signage device, comparing the destination with respect to the position and to a coverage area of the determined dynamic signage device, when the destination is outside the coverage area of the determined dynamic signage device, an itinerary is determined by selecting at least one dynamic signage device of the network which will relay the determined dynamic signage device; ending a first control signal to the determined dynamic signage device, the control signal indicating the angle of rotation that has to be taken by the directional display member of the determined dynamic signage device; sending a second control signal to the determined dynamic signage device, the second control signal indicating at least the destination of the user.

10 Claims, 2 Drawing Sheets

(56) References Cited

U.S. PATENT DOCUMENTS

2014/0152869 A1* 6/2014 Solotko .............. G06Q 10/10
   348/231.3
2015/0109186 A1* 4/2015 Layson, Jr. ......... G02B 27/017
   345/8

* cited by examiner

METHOD FOR CONTROLLING A NETWORK OF DYNAMIC SIGNAGE DEVICES AND GUIDANCE SYSTEM CONFIGURED TO IMPLEMENT SUCH A CONTROL METHOD

CROSS REFERENCE TO RELATED APPLICATION

This application is related to and claims the benefit of French Patent Application Number 15/52011 filed on 11 Mar. 2015, the contents of which are incorporated by reference in their entirety.

FIELD OF THE INVENTION

The present invention concerns the field of directional signs with dynamic content. In general, these signs are set in crowded places such as shopping malls, towns and theme parks, etc.

Conventionally, directional signs with dynamic content or dynamic signage device comprise an electronic graphical surface for modifying the content of the information as desired. Their motor-driven arrows allow pointing, independently from each other, in any direction over 360°.

BACKGROUND OF THE INVENTION

Thanks to this type of dynamic signage device, it is possible to cover all the events or places of a given perimeter while significantly limiting the vast number of arrows with respect to the number of events or places.

Despite the high technology embedded within these dynamic signage devices, the latter differ slightly from the conventional static signage devices which cannot be customized by an ordinary user.

BRIEF SUMMARY OF THE INVENTION

The invention aims to overcome all or part of the aforementioned drawbacks.

The object of the invention is a method for controlling a network of dynamic signage devices, comprising the following steps:

Step E1: Collecting the destination of the user,
Step E2: Detecting a user within a detection perimeter of a determined dynamic signage device,
Step E3: Comparing the destination with respect to the position and to a coverage area of the determined dynamic signage device, when the destination is outside the coverage area of the determined dynamic signage device, an itinerary is determined by selecting at least one dynamic signage device of the network which will relay the determined dynamic signage device,
Step E4: Sending a first control signal by the server to the determined dynamic signage device, the control signal indicating the angle of rotation that has to be taken by the directional display member of the determined dynamic signage device,
Step E5: Sending a second control signal by the server to the determined dynamic signage device, the second control signal indicating at least the destination of the user.

Thus, thanks to the invention, it is possible to customize the guidance of the user up to its destination without resorting to any external additional navigation equipment.

According to a feature of the invention, the presence of the user within the detection perimeter of the determined dynamic signage device is detected by a user terminal by comparison of the position coordinates of the user to the position of the determined dynamic signage device, the presence of the user within the detection perimeter being transmitted to at least one server which triggers steps E3, E4 and E5.

According to a feature of the invention, the control method comprises an additional step E1a of collecting the position of the user and a step E1b of obtaining the identity of the dynamic signage device closest to the user, from the comparison of the data collected at steps E1, E1a to a mapping of the network of dynamic signage devices, the mapping indicating the position of each dynamic signage device and their coverage area, steps E1a and E1b being prior to step E2.

Thus, the user is conducted into the detection perimeter of a determined dynamic signage device, in this case the dynamic signage device closest to the position of the user.

According to another feature of the invention, steps E3, E4 and E5 are triggered when the user enters into a detection perimeter of the determined dynamic signage device.

According to a feature of the invention, as long as the user terminal is within the detection perimeter of the determined dynamic signage device, the server repeats at least step E1, E1e and E1f. To do so, the user terminal continuously sends the position of the user to the server as long as he is within the detection perimeter of the determined dynamic signage device.

Advantageously, the detection perimeter of a dynamic signage device is smaller than or equal to the coverage area of said dynamic signage device.

Preferably, the detection perimeter of each dynamic signage device is defined based on the locomotion mode of the user.

Advantageously, the position of the user corresponds to coordinates using the global localization system, commonly called <<GPS>> or <<Global Positioning System>>.

According to a feature of the invention, steps E1 and E1a may be carried out simultaneously or consecutively.

According to another feature of the invention, steps E4 and E5 may be carried out simultaneously or consecutively.

According to a feature of the invention, the control method comprises a sub-step E1e in which the user terminal sends the data collected at least at steps E1 and E1a to the server.

According to a feature of the invention, the control method comprises a sub-step E1f in which the server receives the data collected and sent by the user terminal.

According to a feature of the invention, the identity of the dynamic signage device closest to the user is determined by the user terminal and is sent to the server.

According to a feature of the invention, when determining the identity of the dynamic signage device closest to the user, from the user terminal, the control method comprises a first sub-step E2a prior to step E1b in which the server sends the position of each one of the dynamic signage devices of the network, a second sub-step E2b prior to step E1b in which the user terminal receives the positions of each dynamic signage device.

Alternatively and according to a feature of the invention, the identity of the dynamic signage device closest to the user is determined by the server.

According to a feature of the invention, when determining the identity of the dynamic signage device closest to the user, from the server, step E1b is carried out without any prior sub-step.

According to another feature of the invention, said control method comprises an additional step E1c in which the locomotion mode of the user is collected, step E1c being carried out prior to step E1b.

According to a feature of the invention, step E1c is carried out either simultaneously with or consecutively to at least one of steps E1a and/or E1.

According to a feature of the invention, collection of the locomotion mode is carried out by the user terminal.

According to a feature of the invention, the user terminal sends the locomotion mode of the user to the server before step E3 is carried out so that determination of the itinerary of step E3 is carried out at least based on the data collected at steps E1, E1a and E1c.

According to another feature of the invention, said control method comprises an additional step E1d in which a visual marker for identifying the user is collected, step E1d being carried out prior to step E5.

According to a feature of the invention, the control method comprises a step E1g, in which the server associates the destination collected at step E1 to an event and communicates said event to the user terminal.

According to a feature of the invention, collection of the visual marker for identifying the user is carried out by the user terminal.

According to a feature of the invention, the user terminal sends to the server the visual marker for identifying the user before step E5 is carried out so that during step E5, the second control signal also commands the display of said visual marker for identifying the user.

For example, the visual marker for identifying the user consists of a message and/or a luminous signal and/or a pseudonym.

According to a feature of the invention, the directional display member displays the visual marker for identifying the user at regular intervals, for example every 10 seconds.

According to a feature of the invention, the directional display member is configured to display one or several predetermined event(s) or destination(s) and to be oriented in the direction of the predetermined event(s) or destination(s).

According to a feature of the invention, the control method further comprises an additional step E6 of stopping the display in which the server sends a third control signal to the dynamic signage device closest to the user indicating the end of the display of the directional member of the dynamic signage device closest to the user.

According to a feature of the invention, step E6 is triggered after a predetermined display time.

Alternatively or complementarily, step E6 is triggered when the user leaves the detection perimeter of the dynamic signage device closest to the user.

Alternatively, step E6 is triggered when the user terminal does no longer send the position of the user to the server, the absence of signal from the terminal being considered by the server as being the absence of user within the detection perimeter of the dynamic signage device.

Thus, as long as the user is within the detection perimeter of the dynamic signage device closest to the user, his destination is displayed at regular intervals on the directional display member of said dynamic signage device.

According to a feature of the invention, the exit of the user in the detection perimeter of the dynamic signage device closest to the user is detected by the user terminal by comparison of the position data of the user to the position of the dynamic signage device closest to the user, the exit of the user in the detection perimeter being transmitted to the server which triggers step E6.

The object of the invention is also a system for guidance within a given area arranged to implement the control method according to the invention, said guidance system comprising at least one network of dynamic signage devices, at least one server configured to receive data from a user terminal, said server controlling each dynamic signage device of the network based on the data sent by the user terminal.

According to a feature of the invention, the data received by the server and sent by the user terminal consist of user identification data and/or geolocation data and/or dynamic signage device identification data and/or data relating to the locomotion mode of the user and/or data relating to the destination of the user.

According to a feature of the invention, the network of dynamic signage devices comprises at least a first and a second dynamic signage devices, each dynamic signage device being active within a predetermined coverage area, each dynamic signage device comprising at least one directional display member configured to indicate at least one information according to a determined orientation.

According to a feature of the invention, the network of dynamic signage devices is a mesh network.

In the present invention, "mesh network" means that each dynamic signage device of the network is grouped within a meshing the intelligence of which, in this case the server, is centralized and offset.

According to a feature of the invention, each dynamic signage device has a user detection perimeter.

Advantageously, each coverage area of each dynamic signage device covers, at least in part, at least one other coverage area of another dynamic signage device.

Preferably, the detection perimeter of each dynamic signage device is defined based on the locomotion mode of the user. For example, when the user is travelling on foot, the detection perimeter is of about 40 m. For example, when the user is travelling by bicycle, the detection perimeter is of about 60 m.

According to a feature of the invention, at least the directional display member of the first dynamic signage device comprises at least one support, at least one drive member configured to allow the rotational displacement of the directional display member with respect to said support, said drive member being controlled by a control unit intended to be connected to a server.

According to a feature of the invention, at least the directional display member of the first dynamic signage device comprises an area equipped with luminous elements.

According to a feature of the invention, at least the directional display member of the first dynamic signage device comprises a graphical area configured to display at least one information, for example the destination of the user.

According to a feature of the invention, the information may also be a visual marker for identifying the user such as a message and/or a luminous signal and/or a pseudonym.

BRIEF DESCRIPTION OF THE SEVERAL VIEWS OF THE DRAWINGS

The invention will be better understood, thanks to the description hereinafter, which relates to embodiments according to the present invention, given as non-limiting examples and explained with reference to the appended schematic drawings in which.

DETAILED DESCRIPTION OF THE INVENTION

The present invention concerns a method for controlling a network of dynamic signage devices and a guidance system allowing to implement said control method.

Figure 1:
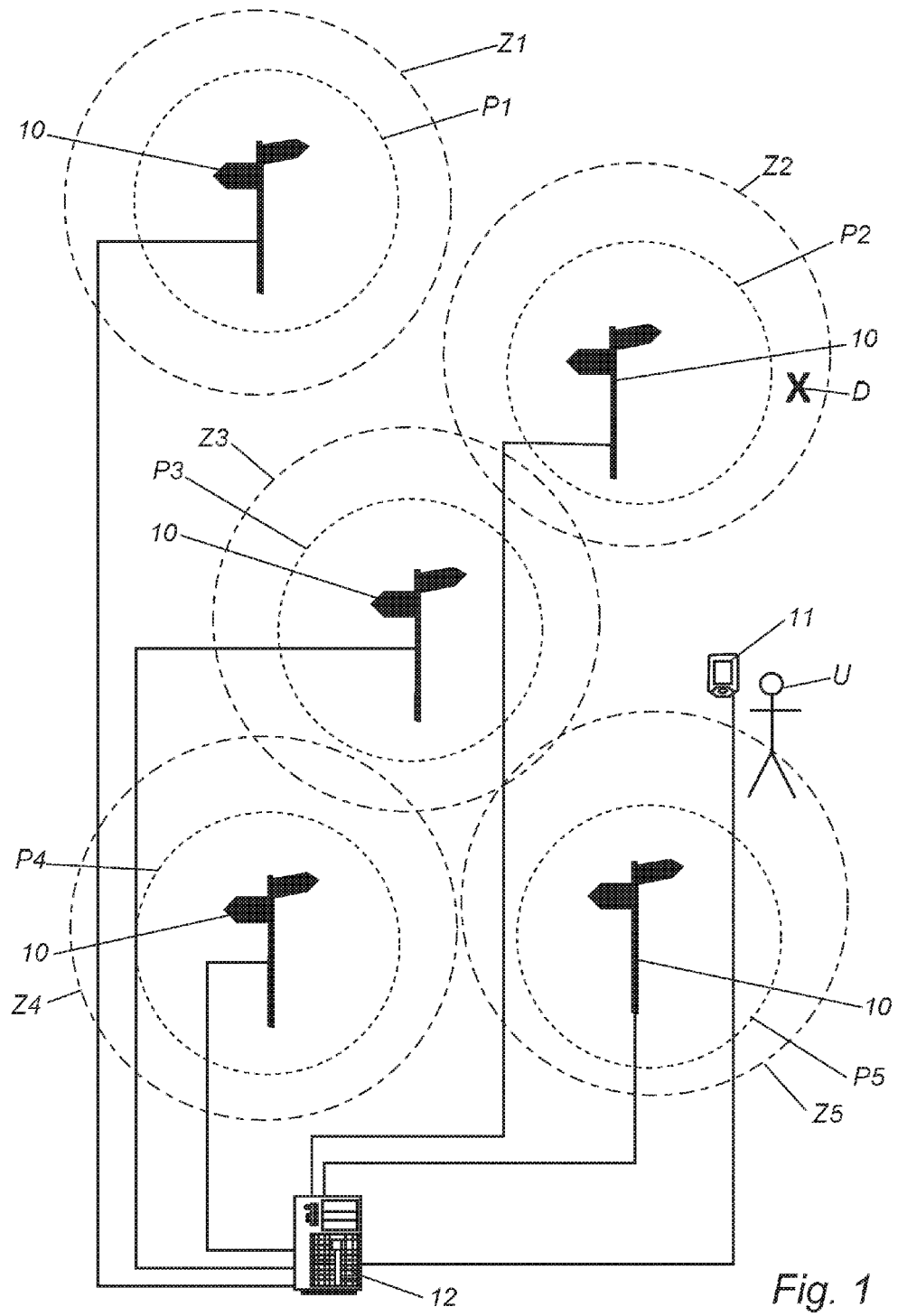
FIG. 1 represents the guidance system according to the invention according to an embodiment.

In FIG. 1, there is represented the guidance system 1 according to the invention according to an embodiment, the guidance system 1 comprises at least one network of dynamic signage devices 10, at least one server 12 configured to receive data from a user terminal 11, said server 12 controlling each dynamic signage device 10 of the network based on the data sent by the user terminal 11.

Each dynamic signage device 10 comprises a coverage area Z1, Z2, Z3, Z4, Z5, delimiting together a given perimeter P within which the network of dynamic signage devices is implanted and within which the guidance system is active.

In addition, each dynamic signage device 10 comprises a user detection perimeter P1, P2, P3, P4, P5. The coverage area Z1, Z2, Z3, Z4, Z5 of each dynamic signage device may be identical to or larger than the user detection perimeter P1, P2, P3, P4, P5.

Each dynamic signage device comprises a directional display member mounted on a support. The directional display member comprises a graphical area configured to display visual data. The directional display member is movable in rotation about its support so as to indicate a direction. The directional display member comprises a peripheral edge equipped with luminous elements such as LEDs.

The detail of the control method will now be described, reference to the steps will be bracketed.

When a user U desires to use the network of dynamic signage device in order to reach a destination D, the user terminal 11 of the user U must have a dedicated application designed to communicate with the network of dynamic signage devices through at least one server 12.

Once the application is downloaded and a user account is created, the position of the user (E1a), the destination of the user (E1) and, optionally, the locomotion mode (E1c), an identifying visual marker (E1d), are collected. This collection may be performed either by a server 12 or by the user terminal 11. In the case where it is actually the user terminal 11 which collects the data, the user terminal 11 sends said data to a server 12 (E1e) which receives them (E1f).

Once the collection is achieved, the identity of the dynamic signage device 10 closest to the user U (E1b) is obtained from the comparison of the previously collected data to a mapping of the network of dynamic signage devices, the mapping indicating the position of each dynamic signage device 10 and their coverage area Z1, Z2, Z3, Z4, Z5.

In the case where obtaining the dynamic signage device closest to the user U is carried out by the user terminal 11, the server 12 communicates the position of each dynamic signage device 10 to said user terminal 11 (E2a) and the user terminal 11 receives this mapping (E2b).

Furthermore, the server associates the destination to an event when appropriate, and communicates said event to the user terminal.

After identifying the dynamic signage device closest to the user U, the server 12 compares the destination with respect to the position and to the coverage area of the dynamic signage device closest to the user U (E3), when the destination is outside the coverage area of the dynamic signage device closest to the user U, the server 12 determines an itinerary by selecting which of the dynamic signage device(s) will relay the dynamic signage device 10 closest to the user U, determining the itinerary is carried out at least based on the data collected at steps E1a, E1, and optionally E1c.

After determining the itinerary, the server sends (E4) a first control signal to the dynamic signage device closest to the user U, the control signal indicating the angle of rotation that has to be taken by the directional display member of the dynamic signage device closest to the user U. Furthermore, the server 12 also sends (E5) a second control signal to the dynamic signage device closest to the user U, the second control signal indicating at least the destination of the user or the associated event.

Advantageously, steps E3, E4 and E5 are triggered when the user U is present within the detection perimeter P1, P2, P3, P4, P5 of the dynamic signage device closest to the user U.

According to a feature of the invention, the presence of the user within the detection perimeter of the dynamic signage device closest to the user U is detected by the user terminal 11 by comparison of the position coordinates of the user to the position of the dynamic signage device closest to the user U, the presence of the user U within the detection perimeter being transmitted to the server 12 which triggers steps E3, E4 and E5.

When the user leaves the detection perimeter P1, P2, P3, P4, P5 of the dynamic signage device closest to the user U, then the user terminal sends an absence signal within the detection perimeter to the server 12, said server 12 then sends (E6) a third control signal to the dynamic signage device closest to the user U indicating the end of the display of the directional member of the dynamic signage device closest to the user U.

Advantageously, the exit of the user U in the detection perimeter of the dynamic signage device closest to the user U is detected by the user terminal by comparison of the position data of the user to the position of the dynamic signage device closest to the user U, the exit of the user U in the detection perimeter P1, P2, P3, P4, P5 being transmitted to the server 12 which triggers step E6.

Figure 2:
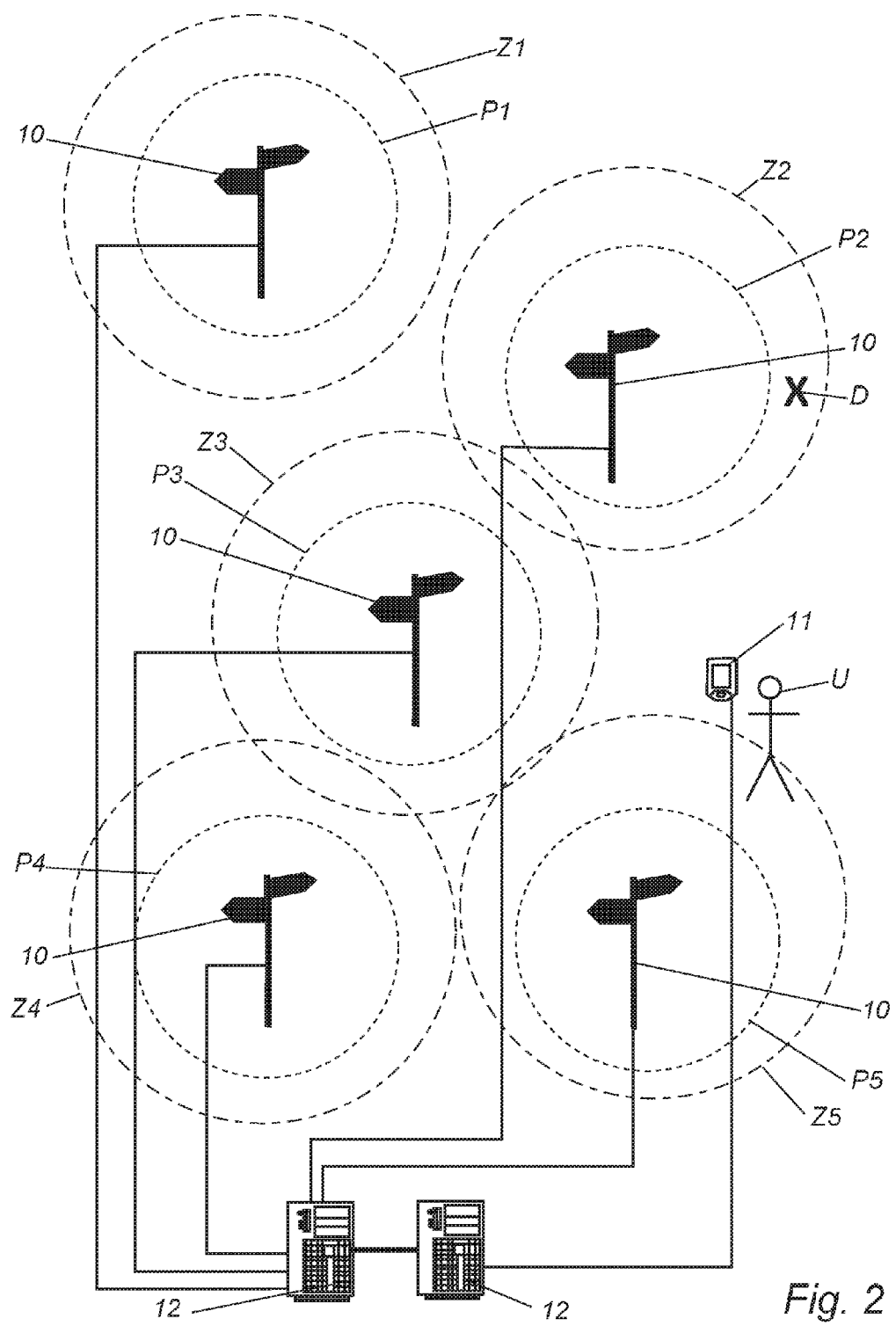
FIG. 2 represents the guidance system according to the invention according to a variant of the embodiment represented in FIG. 1.

In the variant represented in FIG. 2, the only fact that changes is that the guidance system comprises two servers 12. Thus, one server communicates exclusively with the user terminal and the other server is in charge of controlling the network of dynamic signage devices.

Of course, the invention is not limited to the embodiment described and represented in the appended figures. Modifications remain possible, in particular as regards the constitution of the various elements or by substitution of technical equivalents, without nonetheless departing from the protection field of the invention.

The invention claimed is:

1. A method for controlling a network of dynamic signage devices each equipped with at least a directional display member, the said method, comprising the following steps:

Step E1: Collecting a destination of a user,

Step E2: Detecting the user within a detection perimeter of a determined dynamic signage device, Step E3: Comparing the destination with respect to a position of the determined dynamic signage device and to a coverage area of the determined dynamic signage device, when the destination is outside the coverage area of the determined dynamic signage device, an itinerary is determined by selecting at least one dynamic signage device of the network which will relay the determined dynamic signage device, Step E4: Sending a first control signal to the determined dynamic signage device, the control signal indicating an angle of rotation that has to be taken by the directional display member of the determined dynamic signage device, Step E5: Sending a second control signal to the determined dynamic signage device, the second control signal indicating at least the destination of the user.

2. The control method according to claim 1, wherein the presence of the user within the detection perimeter of the determined dynamic signage device is detected by a user terminal by comparison of a position coordinate of the user to the position of the determined dynamic signage device, the presence of the user within the detection perimeter being transmitted to at least one server which triggers steps E3, E4 and E5.

3. The control method according to claim 1, wherein the control method comprises an additional step E1a of collecting the position of the user and a step E1b of obtaining the identity of the dynamic signage device closest to the user, from the comparison of the data collected at steps E1, E1a to a mapping of the network of dynamic signage devices, the mapping indicating the position of each dynamic signage device and their coverage area, steps E1a and E1b being prior to step E2.

4. The control method according to claim 3, wherein the identity of the dynamic signage device closest to the user is determined by a user terminal and is sent to a server.

5. The control method according to claim 3, wherein the identity of the dynamic signage device closest to the user is determined by a server.

6. The control method according to claim 3, comprising an additional step E1c in which a locomotion mode of the user is collected, step E1c being carried out prior to step E1b.

7. The control method according to claim 1, comprising an additional step E1d in which a visual marker for identifying the user is collected, step E1d being carried out prior to step E5.

8. The control method according to claim 1, further comprising an additional step E6 of stopping the display in which the server sends a third control signal to the dynamic signage device closest to the user indicating the end of the display of the directional member of the dynamic signage device closest to the user.

9. A guidance system within a given area arranged to implement the control method according to claim 1, said guidance system comprising at least one network of dynamic signage devices, at least one server configured to receive data from a user terminal, said server controlling each dynamic signage device of the network based on the data sent by the user terminal.

10. The guidance system according to claim 9, wherein the network of dynamic signage devices comprises at least a first and a second dynamic signage devices, each dynamic signage device being active within a predetermined coverage area, each dynamic signage device comprising at least one directional display member configured to indicate at least one information according to a determined orientation.

* * * * *